UNITED STATES PATENT OFFICE 2,161,949

PROCESS FOR COAGULATING DISPERSIONS

William S. Calcott, Woodstown, N. J., and Mortimer A. Youker, Gordon Heights, Del., assignors to E. I. du Pont de Nemours & Company, Wilmington, Del., a corporation of Delaware No Drawing. Application December 24, 1937, Serial No. 181,602

11 Claims. (Cl. 260—89)

This invention relates to the coagulation of dispersions and more particularly to the coagulation of unusually stable dispersions. Still more particularly it relates to the coagulation of rubber-like materials dispersed in aqueous solutions of substituted ammonium salts.

It is known that dispersions of materials in aqueous solutions, wherein substituted ammonium salts are the dispersing agents, are of unusual stability. Such dispersions are coagulated only very incompletely or else not at all by common coagulating agents such as acids and salts. While such dispersions may be coagulated by the addition of large quantities of ethyl alcohol, this method has the disadvantage incident to the use of large volumes of materials and is, moreover, rather expensive.

It is an object of this invention to provide a method for the coagulation of unusually stable dispersions. Another object is the coagulation of aqueous dispersions in which the dispersing agent is a substituted ammonium salt containing a long chain aliphatic group. A further object is a method for the coagulation of aqueous dispersions of rubber-like materials in which the dispersing agent is a substituted ammonium salt containing a long chain aliphatic group. Further objects will appear hereinafter.

These objects have been accomplished by treating the said dispersions with a combination of a water-soluble salt and an appreciably water-soluble organic compound of the group consisting of alcohols, aldehydes, ketones, and carboxylic acids.

In the following examples, which are given by way of illustration only, the parts are stated by weight.

Example I

A dispersion of a plastic polymer of 2-chloro-1,3-butadiene is prepared as follows according to the method described in a copending application, Starkweather, Ser. No. 69,739, filed March 19, 1936. 250 parts of 2-chloro-1,3-butadiene are thoroughly emulsified in 850 parts of 2% cetyl trimethyl ammonium bromide $$(C_{16}H_{33}-N(CH_3)_3-Br)$$

aqueous solution. 150 parts more of the same solution containing 10 parts of sulfur dioxide, are immediately added to the emulsion, which is allowed to polymerize for 16 hours at about room temperature. The polymerization is arrested by adding 2.5 parts of phenyl-beta-naphthylamine dissolved in benzene and dispersed in more of the emulsifying solution. The resulting polymer dispersion (100 parts) is treated, with stirring, with 100 parts of a 7% solution of normal butyl alcohol in water and then with 500 parts of a saturated aqueous solution of sodium chloride. Complete coagulation in coherent, easily handled form, takes place.

Alternatively, the sodium chloride (15 parts) may be dissolved in the 100 parts of polymer dispersion, which is then completely coagulated by adding about 150 parts of the butyl alcohol solution. If 28 parts of sodium chloride are used, only about 60 parts of the 7% butyl alcohol solution or 50 parts of 95% ethyl alcohol are required.

Example II

A dispersion of mixed polymers is prepared by emulsifying 43 parts of butadiene and 30 parts of methyl methacrylic nitrile in 70 parts of a 3% aqueous solution of oleamidoethyl dimethylamine hydrochloride $$(C_{17}H_{33}-CO-NH-CH_2-CH_2-N(CH_3)_2.HCl)$$

and 4 parts of normal acetic acid and heating at 60° C. for 160 hours. The resulting polymer dispersion is diluted with water to 25% concentration. This dispersion is completely coagulated when 100 parts are treated with 120 parts of saturated sodium chloride solution and 100 parts of a 7% solution of normal butyl alcohol in water.

The dispersing agents, which produce the unusually stable dispersions to which the coagulation process of this application is particularly applicable, consist of members of the group consisting of substituted ammonium salts containing a long chain aliphatic group. The term "substituted ammonium salts containing a long chain aliphatic group" is more fully explained by stating that "long chain" means an open chain of 10 or more carbon atoms. Chain lengths of 12 to 18 carbon atoms are very satisfactory although the invention is not limited to such length. The long chain aliphatic group may be a simple aliphatic radical, for example, the octadecyl radical, or the cetyl radical as in Example I. It may contain other atoms in addition to carbon atoms in the chain, for example, the oleamidoethyl radical $$(C_{17}H_{33}-CO-NH-CH_2-CH_2-)$$

The substituted ammonium salt may be an inner salt of the betaine type, for example, N-cetyl-alpha-betaine or C-cetyl-alpha-betaine. The making of dispersions of chloro-2-butadiene-1,3 with betaines as the dispersing agent has been disclosed elsewhere (see U. S. application Ser. No. 128,630, filed March 2, 1937).

While the process is particularly applicable to dispersions in which the dispersing agents are substituted ammonium salts containing a long chain aliphatic group, nevertheless, the combination of coagulants herein disclosed is also useful in coagulating other dispersions; for example, those unusually stable dispersions in which the dispersing agents are soluble salts of sulfonic acids obtainable by hydrolysis of the products of the reaction of a mixture of sulfur dioxide and a halogen upon a long chain non-aromatic hydrocarbon. (Such dispersing agents may be prepared according to the disclosure of U. S. Patent 2,046,090, issued June 30, 1936.) A further example of dispersions in which the combination of coagulants herein disclosed is used are the usually stable dispersions in which the dispersing agents are members of the class of aromatic compounds of the general structure obtained by condensing sulfonic acids of aromatic hydrocarbons or their equivalents with formaldehyde or its equivalent, more specifically dispersing agents obtained by condensing naphthalene sulfonic acids with formaldehyde in the manner disclosed by U. S. Patent No. 2,046,757.

The process in its preferred embodiment is applied to dispersions of rubber-like materials such as rubber-like polymers of 2-chloro-1,3-butadiene, 2-bromo-1,3-butadiene, butadiene, isoprene, 2-chloro-3-methyl-1,3-butadiene, 2-bromo-3-methyl-1,3-butadiene and 2,3-dimethyl-1,3-butadiene or mixtures of polymers of these dienes with other polymerizable substances wherein substituted ammonium salts containing a long chain aliphatic group are dispersing agents. Because of their commercial importance, polymers of 2-chloro-1,3-butadiene are especially valuable. Although this invention relates primarily to dispensions of rubber-like materials, it is also applicable to dispersions of any other substance, such as resins, oils, waxes and the like, and other materials which may be dispersed by the said substituted ammonium salts containing a long chain aliphatic group. The dispersions may contain antioxidants, pigments and other compounding ingredients. The invention is independent of the concentration of either the dispersed phase or the dispersing agent. Obviously the quantities of coagulants required will vary with the composition of the dispersion.

The essential feature of the invention is the fact that the combination of the action of water-soluble salts with the action of appreciably water-soluble alcohols, aldehydes, ketones or carboxylic acids as described herein is unexpectedly far superior to either the action of alcohols or salts of the prior art alone in coagulating the unusually stable dispersions of the type disclosed. Coagulation by the said combination is much more effective than the summation of the effects of the two materials used alone.

In general, any salt capable of giving an aqueous solution more concentrated than about 10% may be used in the coagulation and the term water-soluble salt thoughout the specification and claims is used to mean a salt whose solubility is about 10% or higher at the temperature at which the coagulation is carried out. Salts of metals containing both organic and inorganic acid radicals are operative provided they are sufficiently soluble in water. By way of example, a few representative salts may be mentioned as follows: sodium chloride, calcium chloride, sodium sulfate, sodium fluoride, sodium carbonate, sodium acetate, potassium iodide and ammonium chloride. It has been found that some salts are more effective in the combination than others. The general rule for coagulation of dispersions by means of salts is that the effectiveness of salts is greater, the greater the charge on the ions which they furnish. We have found, on the other hand, that sodium chloride is more effective in the combination than either magnesium sulfate or alum. The salts which we prefer are the chlorides of alkali and alkaline earth metals and especially the chlorides of sodium and calcium.

Any appreciably water-soluble alcohol, aldehyde, ketone or carboxylic acid is within the scope of the invention. By appreciably water-soluble is meant that the compounds must have a solubility of at least 1% at the temperature at which the coagulation is carried out. These coagulating agents include not only the simple alcohols, aldehydes, ketones and carboxylic acids (both saturated and unsaturated) but also more complex members of these classes, for example, beta ethoxy ethyl alcohol, chloro butenyl alcohol (hydroxy-4-chloro-2-butene-2) and diacetone alcohol (hydroxy-2-methyl-2-pentanone-4) In the preferred form of the invention, alcohols are used in combination with a water-soluble salt. As illustrated in Example 1, alcohols completely miscible with water such as ethyl and methyl alcohols are required in larger amounts than less soluble alcohols such as n-butyl and isobutyl. On the other hand, the still less soluble alcohols, such as n-hexyl and benzyl alcohols, require inconveniently large volumes of water for their most efficient use. The alcohols of intermediate water-solubility (about 8 to 12%) such as n-butyl and isobutyl alcohols are especially preferred. These especially preferred alcohols have the further advantage over the completely water-miscible ones that they do not dissolve antioxidants and other valuable materials from the polymers during the coagulation step. The same considerations of solubility apply to the aldehydes, ketones and carboxylic acids when used as coagulants.

In the preferred form of the invention, the coagulating agents are added in such manner that they mix with the dispersion before mixing with each other. When mixed together before adding to the dispersion, the coagulants are less effective although they are still operative. The order of separately adding the coagulating agents to the dispersion is not important. Either the salt or the alcohol, aldehyde, ketone or carboxylic acid may be added first or they may be added alternatively in small portions. They may be added simultaneously to the dispersion with stirring, for example by adding them on opposite sides of the vessel containing the dispersion. Either may be dissolved directly in the dispersion. Either or both may be added as a solution. They may even be added suspended in a quantity of water insufficient for their complete solution. Coagulation is more uniform and less of the coagulants are required if there is efficient agitation during the coagulation step and hence the process is preferably carried out with agitation. The step may be carried out as a continuous one. For example, by passing the dispersion and coagulants through a long chamber provided with a suitable agitating device.

Though good results are obtained by working at atmospheric pressure, at ordinary temperatures (10 to 30° C.) and at the normal hydrogen ion concentration of the dispersion, this invention is not limited to such conditions but may be carried out at other pressures, at any convenient temperature above the freezing point, and at any hydrogen ion concentration at which the coagulants and components of the dispersion are stable.

The invention affords a simple cheap and convenient method of completely coagulating aqueous dispersions in which the dispersing agent is a substituted ammonium salt containing a long chain aliphatic group.

It is apparent that variations and modifications may be made without departing from the spirit of the invention and such variations and modifications are intended to be included within the scope of the appended claims.

We claim:

1. In the method of treating aqueous dispersions wherein the dispersing agent is a substituted ammonium salt containing a long chain aliphatic group containing more than nine carbon atoms, the step which consists of coagulating the dispersion by the combined action of a salt, the water-solubility of which is at least about 10% at the temperature at which the coagulation is carried out and an organic compound, the water solubility of which is at least 1% at the temperature at which the coagulation is carried out, said compound being selected from the group consisting of alcohols, aldehydes, ketones and carboxylic acids.

2. In the method of treating unusually stable aqueous dispersions of rubber-like materials wherein the dispersing agent is a substituted ammonium salt containing a long chain aliphatic group containing more than nine carbon atoms, the step which consists of coagulating the dispersion by the combined action of a salt, the water solubility of which is at least about 10% at the temperature at which the coagulation is carried out and an organic compound, the water solubility of which is about 8 to 12% at the temperature at which the coagulation is carried out, said compound being compound selected from the group consisting of alcohols, aldehydes, ketones and carboxylic acids.

3. In the method of treating aqueous dispersions of rubber-like materials wherein the dispersing agent is a substituted ammonium salt containing a long chain aliphatic group containing more than nine carbon atoms, the step which consists of coagulating the dispersion by the combined action of a salt, the water-solubility of which is at least about 10% at the temperature at which the coagulation is carried out and an alcohol, the water-solubility of which is at least 1% at the temperature at which the coagulation is carried out.

4. In the method of treating aqueous dispersions of rubber-like materials wherein the dispersing agent is a substituted ammonium salt containing a long chain aliphatic group containing more than nine carbon atoms, the step which consists of coagulating the dispersion with agitation by means of the combined action of a salt selected from the group consisting of chlorides of alkali and alkaline earth metals and an alcohol, the water-solubility of which is at least 1% at the temperature at which the coagulation is carried out.

5. In the method of treating aqueous dispersions of rubber-like polymers of dienes wherein the dispersing agent is a substituted ammonium salt containing a long chain aliphatic group containing more than nine carbon atoms, the step which consists of coagulating the dispersion with agitation by adding a salt selected from the group consisting of chlorides of alkali and alkaline earth metals and separately adding an alcohol, the water-solubility of which is at least 1% at the temperature at which the coagulation is carried out.

6. In the method of treating aqueous dispersions of 2-chloro-1,3-butadiene wherein the dispersing agent is a substituted ammonium salt containing a long chain aliphatic group containing more than nine carbon atoms, the step which consists of coagulating the dispersion with agitation by means of the combined action of a salt selected from the group consisting of chlorides of alkali and alkaline earth metals and an alcohol having a water solubility of about 8 to 12%.

7. In the method of treating aqueous dispersions of rubber-like materials wherein the dispersing agent is a substituted ammonium salt containing a long chain aliphatic group containing more than nine carbon atoms, the step of coagulating the dispersion with agitation by adding sodium chloride and separately adding an alcohol having a water solubility of about 8 to 12%.

8. In the method of treating aqueous dispersions of rubber-like materials wherein the dispersing agent is a substituted ammonium salt containing a long chain aliphatic group containing more than nine carbon atoms, the step of coagulating the dispersion with agitation by adding calcium chloride and separately adding an alcohol having a water solubility of about 8 to 12%.

9. The method which comprises forming an aqueous dispersion with a substituted ammonium salt containing a long chain aliphatic group containing more than nine carbon atoms as the dispersing agent and coagulating said dispersion by means of the combined action of a salt, the water-solubility of which is at least about 10% at the temperature at which the coagulation is carried out and an organic compound, the water-solubility of which is at least 1% at the temperature at which the coagulation is carried out, said compound being selected from the group consisting of alcohols, aldehydes, ketones and carboxylic acids.

10. The method which comprises forming a dispersion of rubber-like materials in an aqueous solution of a substituted ammonium salt containing a long chain aliphatic group containing more than nine carbon atoms and coagulating the dispersion by means of the combined action of a salt, the water-solubility of which is at least about 10% at the temperature at which the coagulation is carried out and an alcohol, the water-solubility of which is at least 1% at the temperature at which the coagulation is carried out.

11. The method which comprises dispersing 2-chloro-butadiene-1,3 in an aqueous solution of a substituted ammonium salt containing a long chain aliphatic group containing more than nine carbon atoms, polymerizing the dispersed 2-chloro-1,3-butadiene and coagulating the dispersion with agitation by adding a salt selected from the group consisting of chlorides of alkali and alkaline earth metals and separately adding an alcohol having a water solubility of between 8 and 12%.

WILLIAM S. CALCOTT.
MORTIMER A. YOUKER.

CERTIFICATE OF CORRECTION.

Patent No. 2,163,949.  June 13, 1939.

WILLIAM S. CALCOTT, ET AL.

It is hereby certified that error appears in the printed specification of the above numbered patent requiring correction as follows: Page 2, first column, line 19, for the word "usually" read unusually; page 3, first column, line 47, claim 2, strike out the word "compound" second occurrence; and that the said Letters Patent should be read with this correction therein that the same may conform to the record of the case in the Patent Office.

Signed and sealed this 8th day of August, A. D. 1939.

Leslie Frazer,
Acting Commissioner of Patents.

(Seal)